US010140750B2

(12) United States Patent
Akenine-Moller et al.

(10) Patent No.: US 10,140,750 B2
(45) Date of Patent: *Nov. 27, 2018

(54) METHOD, DISPLAY ADAPTER AND COMPUTER PROGRAM PRODUCT FOR IMPROVED GRAPHICS PERFORMANCE BY USING A REPLACEABLE CULLING PROGRAM

(71) Applicant: Intel Corporation, Santa Clara, CA (US)

(72) Inventors: Tomas G. Akenine-Moller, Lund (SE); Jon N. Hasselgren, Bunkeflostrand (SE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,405

(22) Filed: Aug. 31, 2016

(65) Prior Publication Data
US 2017/0011542 A1    Jan. 12, 2017

Related U.S. Application Data

(63) Continuation of application No. 12/523,894, filed as application No. PCT/SE2008/000005 on Jan. 23, 2008, now Pat. No. 9,460,552.
(Continued)

(30) Foreign Application Priority Data

Jan. 24, 2007 (SE) ...................................... 0700162

(51) Int. Cl.
*G06T 15/00* (2011.01)
*G06T 15/40* (2011.01)

(52) U.S. Cl.
CPC ............ *G06T 15/005* (2013.01); *G06T 15/40* (2013.01); *G06T 15/405* (2013.01)

(58) Field of Classification Search
None
See application file for complete search history.

(56) References Cited

U.S. PATENT DOCUMENTS 5,600,763 A * 2/1997 Greene ................... G06T 15/06
345/420
6,166,748 A * 12/2000 Van Hook ............... A63F 13/00
345/522

(Continued)

FOREIGN PATENT DOCUMENTS

CN    1170171 A    1/1998
CN    1739117 A    2/2006

(Continued)

OTHER PUBLICATIONS

Hasselgren, Jon, and Thomas Akenine-Möller. "PCU: the programmable culling unit.", Jul. 2007, ACM Transactions on Graphics, vol. 26, No. 3, Article 92.*

(Continued)

Primary Examiner — Robert Bader
(74) Attorney, Agent, or Firm — Trop Pruner & Hu, P.C.

(57) ABSTRACT

It is presented a method for improving performance of generation of digitally represented graphics. Said method comprises the steps of: selecting (440) a tile comprising fragments to process; executing (452) a culling program for the tile, the culling program being replaceable; and executing a set of instructions, selected from a plurality of sets of instructions based on an output value of the culling program, for each of a plurality of subsets of the fragments. A corresponding display adapter and computer program product are also presented.

22 Claims, 7 Drawing Sheets

Related U.S. Application Data

(60) Provisional application No. 60/900,084, filed on Feb. 8, 2007.

(56) References Cited

U.S. PATENT DOCUMENTS

| | | | |
|---|---|---|---|
| 6,636,212 B1* | 10/2003 | Zhu | G06T 15/405 345/421 |
| 7,068,272 B1* | 6/2006 | Voorhies | G06T 15/005 345/422 |
| 7,554,538 B2 | 6/2009 | Wexler et al. | |
| 7,961,185 B2 | 6/2011 | Strom et al. | |
| 2004/0130552 A1* | 7/2004 | Duluk, Jr. | G06T 15/005 345/506 |
| 2004/0207622 A1* | 10/2004 | Deering | G06T 15/50 345/426 |
| 2005/0225670 A1 | 10/2005 | Wexler et al. | |
| 2009/0058852 A1 | 3/2009 | Strom et al. | |

FOREIGN PATENT DOCUMENTS

| | | |
|---|---|---|
| CN | 101681526 | 3/2010 |
| WO | 2004047008 | 3/2010 |

OTHER PUBLICATIONS

Ned Greene, Michael Kass, Gavin Miller, "Hierarchical Z-Buffer Visibility", 1993, ACM, SIGGRAPH '93, Proceedings of the 20th Annual Conference on Computer Graphics and Interactive Techniques, pp. 231-238.*
Timo Aila, Tomas Akenine-Möller, "A Hierarchical Shadow Volume Algorithm", Aug. 30, 2004, ACM, HWWS '04 Proceedings of the ACM SIGGRAPH/EUROGRAPHICS conference on Graphics Hardware, pp. 15-23.*
Solomon Boulos, Ingo Wald, Peter Shirley, "Geometric and Arithmetic Culling Methods for Entire Ray Packets", 2006, School of Computing, University of Utah, Technical Report No. UUCS-06-10.*
Kavita Bala, Bruce Walter, and Donald Greenberg, "Combining Edges and Points for Interactive Anti-Aliased Rendering", Jan. 2002, Technical Report, Cornell University, Program of Computer Graphics, PGC-02-3.*
Luiz Velho, "Mathematical Optimization in Graphics and Vision",Jul. 29, 2003, Course Notes—SIGGRAPH 2003, chapter 7.*
Wolfgang Heidrich, Philipp Slusallek, and Hans-Peter Seidel, "Sampling Procedural Shaders Using Affine Arithmetic", Jul. 1998, ACM, Journal of ACM Transactions on Graphics, vol. 17, Issue 3, pp. 158-176.*
Fred D. Crary, "A Versatile Precompiler for Nonstandard Arithmetics", Jun. 1979, ACM, ACM transactions on Mathematical Software, vol. 5, No. 2, pp. 204-217.*
Herve Bronnimann, Guillame Melquiond, Sylvain Pion, "The design of the Boost interval arithmetic library", 2006, Elsevier, Journal of Theoretical COmputer Science, Real Numbers and Computers, 351 (1), pp. 111-118.*
Affonso De Cusatis Junior, Luiz Henrique De Figuieredo, Marcelo Gattass, "Interval methods for ray casting implicit surfaces with affine arithmetic", Oct. 20, 1999, IEEE Proceedings XII Brazilian Symposium on Computer Graphics and Image Processing, 1999, pp. 65-71.*
Hasselgren, J., et al., "PCU: the Programmable Culling Unit.", Jul. 2007, ACM Transactions on Graphics, vol. 26, No. 3, Article 92.
Greene, N., et al. "Hierarchical Z-Buffer Visibility", 1993, ACM, SIGGRAPH '93, Proceedings of the 20.sup.th Annual Conference on Computer Graphics and Interactive Techniques, pp. 231-238.
Aila, T., et al., "A Hierarchical Shadow Volume Algorithm", Aug. 30, 2004, ACM, HWWS '04 Proceedings of the ACM SIGGRAPH/EUROGRAPHICS conference on Graphics Hardware, pp. 15-23.
Boulos, S., et al. "Geometric and Arithmetic Culling Methods for Entire Ray Packets", 2006, School of Computing, University of Utah, Technical Report No. UUCS-06-10.
Bala, K., et al., "Combining Edges and Points for Interactive Anti-Aliased Rendering", Jan. 2002, Technical Report, Cornell University, Program of Computer Graphics, PGC-02-3.
Velho, L., "Mathematical Optimization in Graphics and Vision", Jul. 29, 2003, Course Notes—SIGGRAPH 2003, chapter 7.
Heidrich,Wolfgang, et al., "Sampling Procedural Shaders Using Affine Arithmetic", Jul. 1998, ACM, Journal of ACM Transactions on Graphics, vol. 17, Issue 3, pp. 158-176.
Crary, F.D., "A Versatile Precompiler for Nonstandard Arithmetics", Jun. 1979, ACM, ACM transactions on Mathematical Software, vol. 5, No. 2, pp. 204-217.
Bronnimann, H., et al., "The design of the Boost interval arithmetic library", 2006, Elsevier, Journal of Theoretical COmputer Science, Real Numbers and Computers, 351 (1), pp. 111-118.
De Cusatis Jr., A., et al., "Interval methods for ray casting implicit surfaces with affine arithmetic", Oct. 20, 1999, IEEE Proceedings XII Brazilian Symposium on Computer Graphics and Image Processing, 1999, pp. 65-71.
PCT International Search Report and Written Opinion issued in corresponding PCT/SE2008/000055 dated Jan. 22, 2009 (12 pages).
Supplementary European Search Report issued in corresponding 08705228.8-1502/2122577 dated Feb. 13, 2015 (3 pages).
CN office action in corresponding CN application No. 201310049065.0 dated Jul. 22, 2015 (14 pages).
CN office action in corresponding CN application No. 201310049065.0 dated Mar. 10, 2016 (4 pages).
CN office action in corresponding CN application No. 200880001484.4 dated May 5, 2011 (16 pages).
CN office action in corresponding CN application No. 200880001484.4 dated Oct. 17, 2011 (7 pages).
CN office action in corresponding CN application No. 200880001484.4 dated Apr. 17, 2012 (18 pages).
EP office action in corresponding EP application No. 08705228.8 dated Feb. 20, 2015 (7 pages).
EP office action in corresponding EP application No. 08705228.8-1502 dated Sep. 28, 2017 (34 pages).

\* cited by examiner

METHOD, DISPLAY ADAPTER AND COMPUTER PROGRAM PRODUCT FOR IMPROVED GRAPHICS PERFORMANCE BY USING A REPLACEABLE CULLING PROGRAM

CROSS-REFERENCE TO RELATED APPLICATIONS

This application is a continuation of non-provisional application claiming priority to Ser. No. 12/523,894 filed Mar. 11, 2010, which is a 371 application of PCT/SE2008/00005 filed on Jan. 23, 2008, which claims priority of provisional application 60/900,084 filed Feb. 8, 2007, hereby expressly incorporated by reference herein.

This application claims priority of Swedish Application No. 0700162-1, filed Jan. 24, 2007.

BACKGROUND

The present invention generally relates to digitally represented graphics and more particularly to improving the performance of generating digitally represented graphics.

Digitally represented graphics, such as computer graphics, is continuously improving in performance.

In the 1980's and 1990's, display adapters for computers and game consoles appeared with graphics accelerators, offloading the Central Processing Unit (CPU) in graphics generation. Initially, the display adapters offered acceleration of 2D graphics, but eventually these also included support for accelerated 3D graphics. Modern display adapters use a processing unit often named a graphics processing unit (GPU).

Due to the complexity of 3D graphics, GPU:s of today use a significant amount of their processing power to perform calculations related to 3D graphics.

A continuous problem with display adapters is performance. There are always new applications and games requiring higher frame rates (rendered screen images per second), higher resolutions and higher image quality, resulting in requirements that each screen image should be rendered in a short a time as possible. In other words, it is always important to increase performance.

Consequently, there is still a problem with insufficient abilities to improve performance in digitally represented graphics.

BRIEF DESCRIPTION OF THE DRAWINGS

Some embodiments are described with respect to the following figures.

DETAILED DESCRIPTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
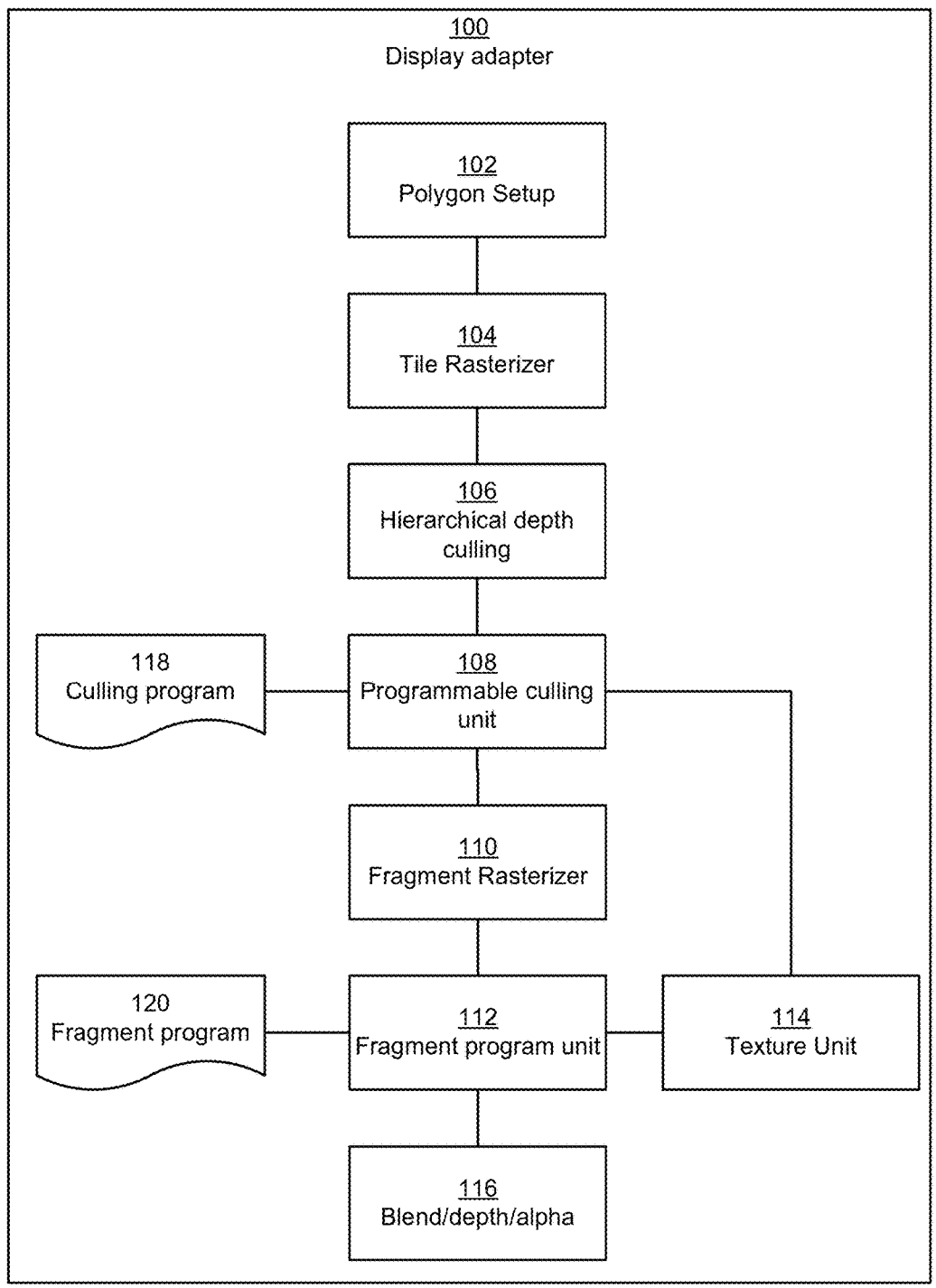
FIG. 1 is a block diagram illustrating how different entities interact in a display adapter in an embodiment of the present invention.

FIG. 1 is a block diagram illustrating how different entities interact in a display adapter 100 in an embodiment of the present invention.

Figure 5:
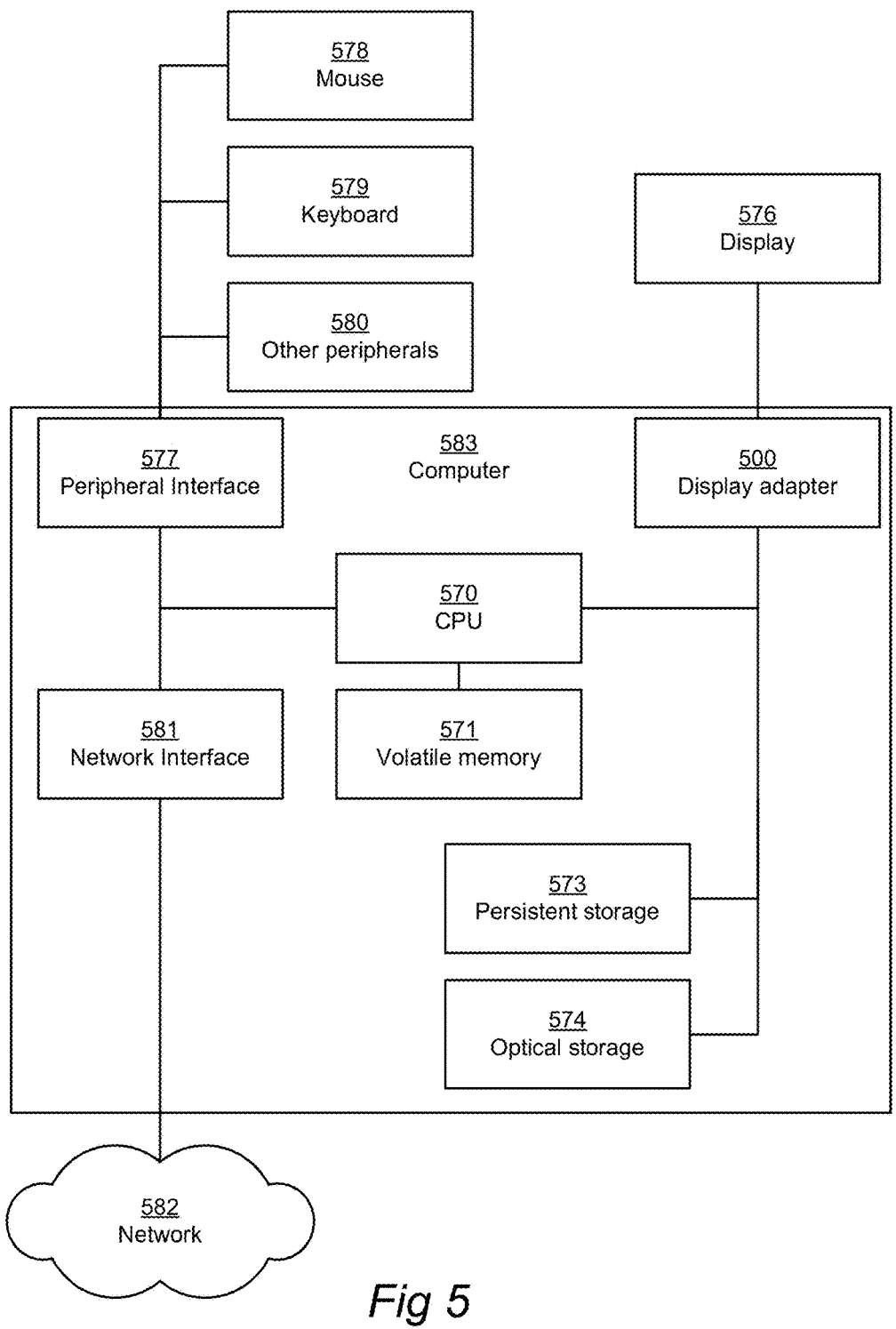
FIG. 5 shows an overview architecture of a typical general purpose computer embodying the display adapter of FIG. 1.

The polygon setup block 102 is responsible for setting up polygons as instructed by a connected CPU 570 (FIG. 5). Although any polygon can be used, triangles are commonly used. For each polygon, a tile rasterizer 104 divides the polygon to be rendered into one or more tiles, where each tile is at least partly overlapped by the polygon. In general, a tile is a group of fragments. In one embodiment, a tile is a two-dimensional rectangle containing a number of fragments. Each of these fragments correspond to a pixel and contain all data required to render the pixel and to test whether the pixel should be rendered on the screen. A common size of a tile is 8 by 8 fragments, although any tile size is within the scope of the invention.

A hierarchical depth culling block 106 performs hierarchical depth culling, which is culling based on depth buffering. Here, a conservative test is performed to prove whether that tile is covered by the contents in the depth buffer. In other words, it is tested if there is another rendered object fully covering polygon in the tile, from the viewers perspective. If that is the case, the entire tile can be culled, i.e. singled out for less processing, e.g. skipped. This then results in performance gains. It is to be noted that the hierarchical depth culling may be performed either before or after the culling of a programmable culling unit 108. This unit is fixed function, which means that it does not execute a replaceable program.

In the programmable culling unit 108, culling is performed according to a replaceable culling program 118, also known as a replaceable culling module. The details of this culling program 118 and the effects are explained in more detail in conjunction with FIG. 4*a* below.

In a fragment rasterizer 110, the tile processed by the programmable culling unit 108 is broken down into fragments, overlapping the polygon. Each of these fragments correspond to a pixel and contain data required to render the pixel and to test whether the pixel should be rendered on the screen. The fragment data includes raster position, depth, color, texture coordinates, stencil, alpha (used for blending), etc. For every pixel there may exist a plurality of fragment samples.

In the fragment program unit 112, the fragments output from the fragment rasterizer are processed using a fragment program 120. The purpose of this unit is to perform tasks such as combining previously evaluated color with textures, as well as to add effects such as fog, as well as to, when possible, identify fragments that do not need to be rendered, i.e. fragment culling.

A texture unit 114 is used for texture lookups, for example using one-dimensional, two-dimensional, three-dimensional, four-dimensional and cube map textures, and provides these to the programmable culling unit 108 and the fragment program unit 112 as required.

The blend/depth/alpha unit 116 uses the fragments provided from the fragment program unit 112 to perform depth testing, alpha testing, and blending before the fragments are written to target buffers.

Figure 2:
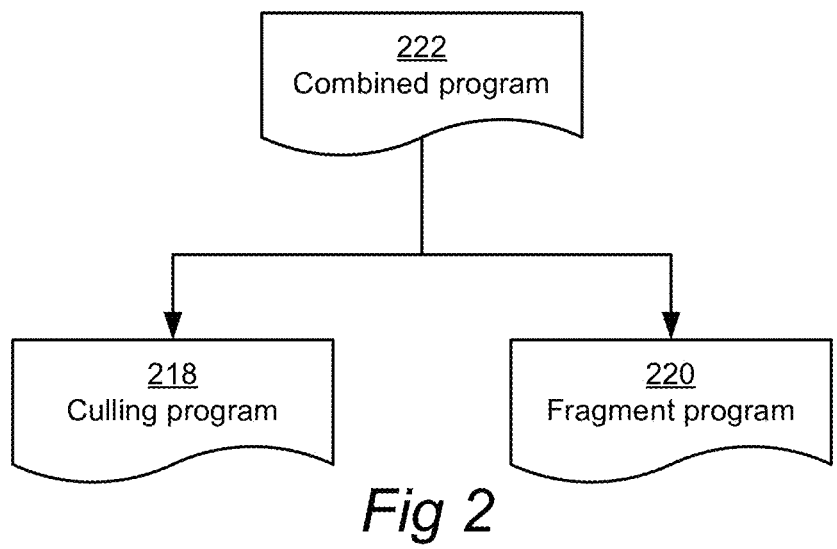
FIG. 2 is a schematic block diagram showing the relationships between different programs used in the display adapter of FIG. 1.

FIG. 2 is a schematic block diagram showing the relationships between different programs used in the display adapter 100 of FIG. 1.

The principle is that a combined program 222 can be used to automatically generate a culling program 218 for use in the programmable culling unit 108 and a fragment program 220 for use in the fragment program unit 112. Optionally, a programmer can write individual culling and fragment programs 218, 220.

As an example, consider the pseudo code segment (1) of a combined program 222, originally written for use as a fragment program:

DP3 d, n, l

KIL d<0

TEX2D c, t0, r1

MUL out.col, d, c   (1)

This program performs basic diffuse lighting by computing the dot product between the light (l) and normal (n) vectors into a result (d) using the DP3 instruction. The n and l vectors varies per fragment. The KIL instruction terminates all fragments where the surface normal does not face the light, indicated by d being less than 0. The TEX2D instruction performs a lookup of a two dimensional texture into c. Finally, the result (d) is multiplied by a diffuse material coefficient (c).

In the novel manner proposed herein, the KIL instruction is an opportunity for culling a whole tile of fragments. But in order to do so, it should be conservatively proven that the condition for the KIL instruction is fulfilled for the whole tile. From this follows that, in this example, it must also be possible to conservatively evaluate the DP3 instruction, since the KIL instruction depends on the result of that instruction. Furthermore, it must be possible to find conservative bounds of the input (the vectors for the normal n and light l in this case) for a whole tile, since the DP3 instruction in turn depends on these values.

In order to implement this chain of conservative evaluations, the programmable culling unit is based on the same instruction set as the fragment program unit. However, instead of floating-point variables as source and destination registers to an instruction, as is typical when processing fragments, intervals are used and the instruction is implemented using principles of interval arithmetic. As a simple example, consider a standard ADD instruction:

ADD c, a, b⇔c=a+b   (2)

For the corresponding programmable culling unit interval instruction, the operands are replaced by intervals, â, b̂, ĉ where an interval, e.g. â, is defined as:

$\hat{a}=[\underline{a},\overline{a}]32\ \{x|\underline{a} \leq x \leq \overline{a}\}$   (3)

The programmable culling unit ADD instruction is then:

ADD ĉ,â,b̂ ⇔ ĉ=â+b̂   (4)

where the interval addition operation is implemented as:

$\hat{a}+\hat{b}=[\underline{a},\overline{a}]+[\underline{b},\overline{b}]=[\underline{a}+\underline{b},\overline{a}+\overline{b}]$   (5)

As can be seen, the result of the interval addition contains all possible results of "normal" additions, or more formally, it holds that a+b ∈ â+b̂ given that a ∈ â and b ∈ b̂. It is therefore conservatively correct. IN similar fashion, the behavior of every instruction in the fragment program instruction set is redefined. Full details of the resulting enhanced instructions are presented here.

| Instruction | Operation | Condition |
|---|---|---|
| Mov dst, src | dst ← src | |
| MAD dst, s1, s2, s3 | dst ← src [min(s1 · s2, $\overline{s1}$ · s2, s1 · $\overline{s2}$, $\overline{s1}$ · $\overline{s2}$, $\overline{s1}$ · $\overline{s2}$) + s3, max(s1 s2, $\overline{s1}$ · s2, · $\overline{s2}$, $\overline{s1}$ · $\overline{s2}$, $\overline{s1}$ $\overline{s2}$) + $\overline{s3}$] | |
| DP4 dst, s1, s2 | dst ← [Σ$_{x, y, z, w}$ min(s1 · s2, $\overline{s1}$ · s2, s1 · $\overline{s2}$, $\overline{s1}$ · $\overline{s2}$), Σ$_{x, y, z, w}$ max(s1· s2, $\overline{s1}$ · s2, s1 · s2, $\overline{s1}$ · $\overline{s2}$)] | |
| RCP dst, src | ds t ← [1/$\overline{src}$, 1/$\underline{src}$] | 0 ∉ src |
| | dst ← (−∞, ∞) | 0 ∈ src |
| RSQ dst, src | dst ← [1/$\overline{src}$, 1/$\underline{src}$] | $\overline{src}$ > 0 |
| | dst ← [NaN, NaN] | $\overline{src}$ ≤ 0 |
| EX2 dst, src | dst ← [2$^{\underline{src}}$, 2$^{\overline{src}}$] | |
| LG2 dst, src | dst ← [log$_2$ $\underline{src}$, log$_2$ $\overline{src}$] | $\underline{src}$ > 0 |
| | dst ← [NaN, NaN] | $\underline{src}$ ≤ 0 |
| MAX dst, s1, s2 | dst ← [max(s1, s2), max($\overline{s1}$, $\overline{s2}$)] | |
| MIN dst, s1, s2 | dst ← [min(s1, s2), min($\overline{s1}$, $\overline{s2}$)] | |
| SGE dst, s1, s2 | dst ← 0 | $\overline{s1}$ < $\underline{s2}$ |
| | dst ← 1 | $\underline{s1}$ ≥ $\overline{s2}$ |
| | dst ← [0, 1] | otherwise |
| SLT dst, s1, s2 | dst ← 0 | $\underline{s1}$ ≥ $\overline{s2}$ |
| | dst ← 1 | $\overline{s1}$ < $\underline{s2}$ |
| | dst ← [0, 1] | otherwise |
| FLR dst, src | dst ← 1 [⌊$\underline{src}$⌋, ⌊$\overline{src}$⌋] | |
| NEG dst, src | dst ← | |
| SAT dst, src | dst ← | |

In addition to using interval instructions, the input must also be defined as intervals. Therefore, it must be possible to compute conservative bounds for quantities interpolated over an entire tile of fragments. This is explained in more detail below. It is to be noted that although interval arithmetic is used herein, any suitable arithmetic representing the whole tile can be used. For example, affine arithmetic can equally well be used within the scope of the present invention.

With the reasoning above, the culling program 218 can in this situation automatically be derived from the combined program (1). Here follows the derived culling program:

DP3 d̂,n̂, l̂(6)

KIL â, <0

Furthermore, here the fragment program 220 is derived from the combined program (1), to be identical to the combined program 220. Here follows the fragment program:

DP3 d, n, l

KIL d<0

TEX2D c, t0, r

MUL out.col, d, c   (7) 1

Figure 3:
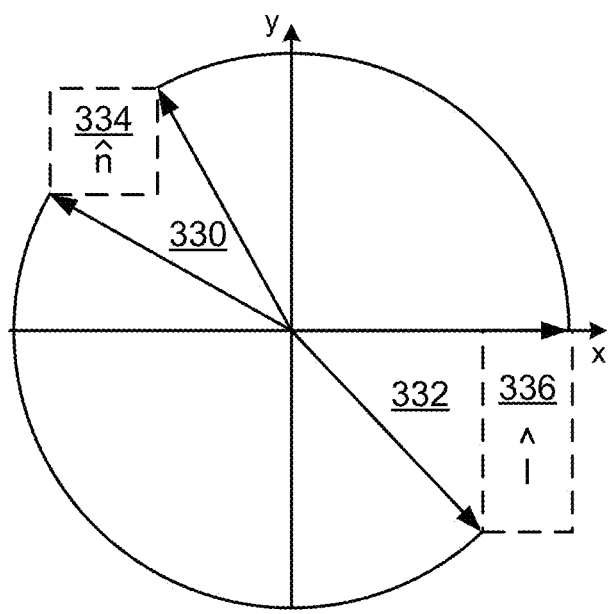
FIG. 3 illustrates an example of where interval arithmetic can be used to cull a tile in the display adapter of FIG. 1.

FIG. 3 illustrates an example of where interval arithmetic can be used to cull a tile in the display adapter 100 of FIG. 1.

For an entire tile of fragments, assume that it is determined that the input interval 334 of its normals 330 is $\hat{n}=([-\sqrt{3}/2, -\frac{1}{2}], [\frac{1}{2}, \sqrt{3}/2])$, and the interval 336 for its light vector 332 is $\hat{l}=([1/\sqrt{2}, 1], [-1/\sqrt{2}, 0])$, as illustrated in FIG. 3. The z-coordinates are assumed to be zero, which simplifies this illustrative example. The dot product between these interval representations results in $\hat{d}=\hat{n} \cdot \hat{l}=[-(\sqrt{6}+\sqrt{3})/\sqrt{8}, -1/\sqrt{8}]$ (see the DP3 instruction in Table 1). It can thus be concluded that a can be at most be $\overline{d}=-1/\sqrt{8}$. Since this value is strictly less than zero, in the culling program explained above with reference to in FIG. 2, this whole tile can be culled without executing the fragment program for every fragment, as will be explained in some further detail with reference to FIG. 4a below. This is a source of a performance gain in the present invention.

Figure 4A:
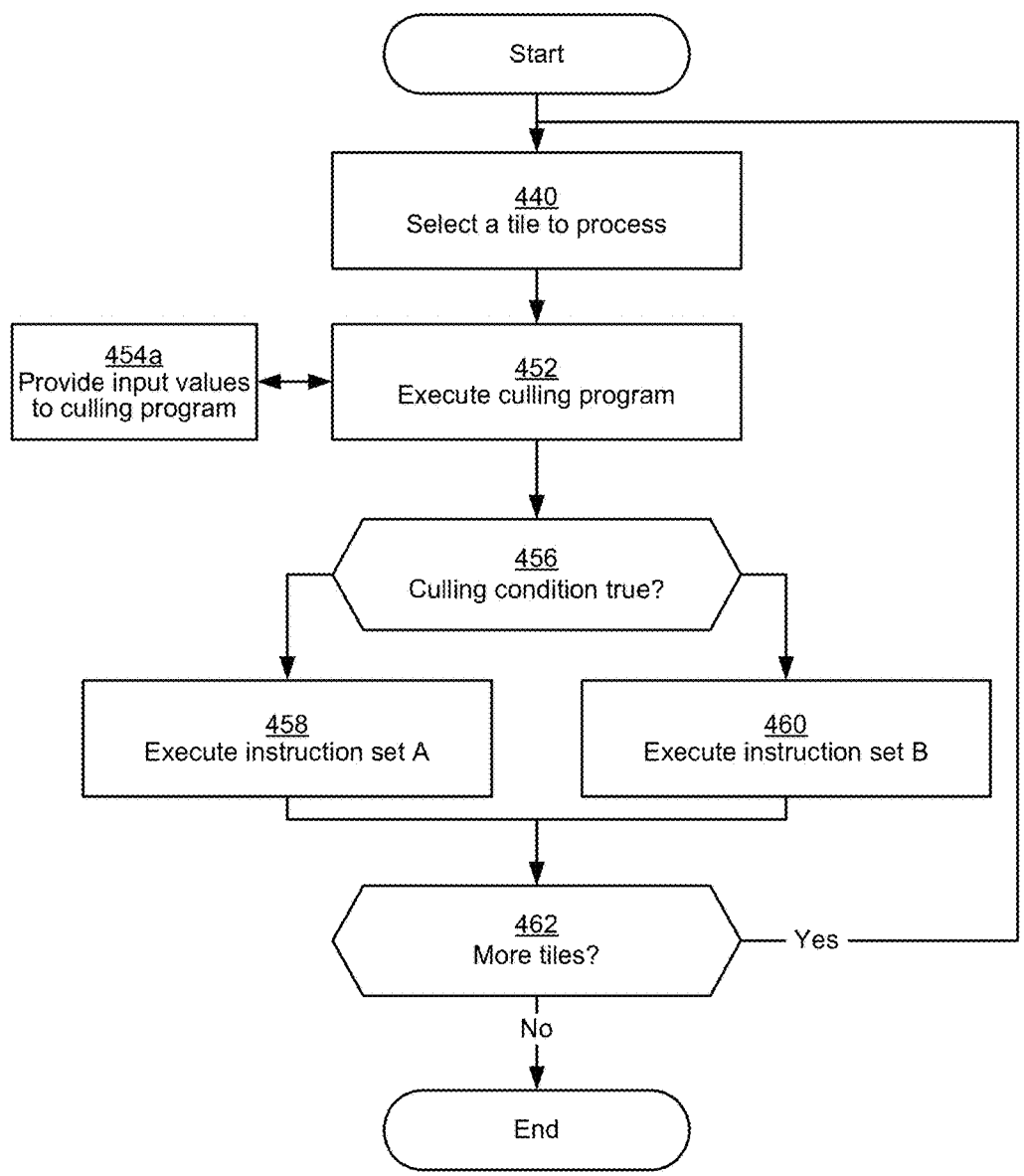
FIGS. 4*a* and 4*b* show flow charts for culling processes that can be executed in the display adapter of FIG. 1.

FIG. 4a shows a flow chart for a culling process that can be executed in the display adapter 100 of FIG. 1. When this process starts, a polygon has been selected to be rendered.

The culling program is then executed in the execute culling program step 452.

In this embodiment, when the culling program requests input values, the process continues to provide input values to culling program step 454a. The input values are values relating to a characteristic representing all fragments in the tile in some manner. For example, input values could be normals, position coordinates, light vectors, colors, texture coordinates, etc. The requested input values are calculated, in this embodiment, using interval arithmetic. In other words, the input values are only calculated when they are needed, according to a 'pull' mechanism, in contrast to the 'push' mechanism explained with reference to FIG. 4b below. The result of the culling program is whether the currently processed tile should be culled or not. This can be determined strictly, whereby the tile is culled only if the current polygon makes no contribution to the finally rendered image, in the region of the tile. Alternatively, lossy culling can be performed, whereby the tile is culled if a contribution of the current polygon to the finally rendered image falls below a certain threshold value, in the region of the tile.

When the culling program has finished processing, the process continues to a conditional culling condition true step 456. In this step, it is determined whether the culling should be performed for the currently processed tile or not according to the output of the culling program. If culling is to be performed, the process continues to an execute instruction set A step 458. Otherwise, the process continues to an execute instruction set B step 460. In one embodiment, if the culling condition is false, the tile is broken into several smaller tiles and the process returns to the select tile to process step 440. This can be repeated successively for smaller and smaller tiles, implementing a hierarchical, multilevel culling process.

It is to be noted that the culling program may also output other results than a culling condition. These results may be sent down the graphics pipeline for further processing. An example of such an embodiment would comprise reversing the order of the hierarchical depth culling unit 106 (FIG. 1) and the programmable culling unit 108 (FIG. 1). The programmable culling unit computes a bounds or interval of the depth values in a tile, and this interval is sent to the hierarchical depth culling unit. The hierarchical depth culling unit then performs culling based on depth values that are computed by a program.

In the execute instruction set A step 458, an instruction set A is performed for a subset of the tile, typically fragments. The fragments typically collectively cover all pixels of the tile, that overlaps the triangle being processed.

In the execute instruction set B step 460, an instruction set B is performed for a subset of the tile, typically fragments. This is typically a conventional processing of rendering of the fragments after the tile stage.

The instruction set A is typically less demanding than the instruction set B, resulting in a reduced number of instructions processed for the tile when the culling condition is determined to be true, resulting in increased performance. In one embodiment, the instruction set A is empty, leading to a considerable reduction in processing, i.e. increased performance.

Figure 4B:
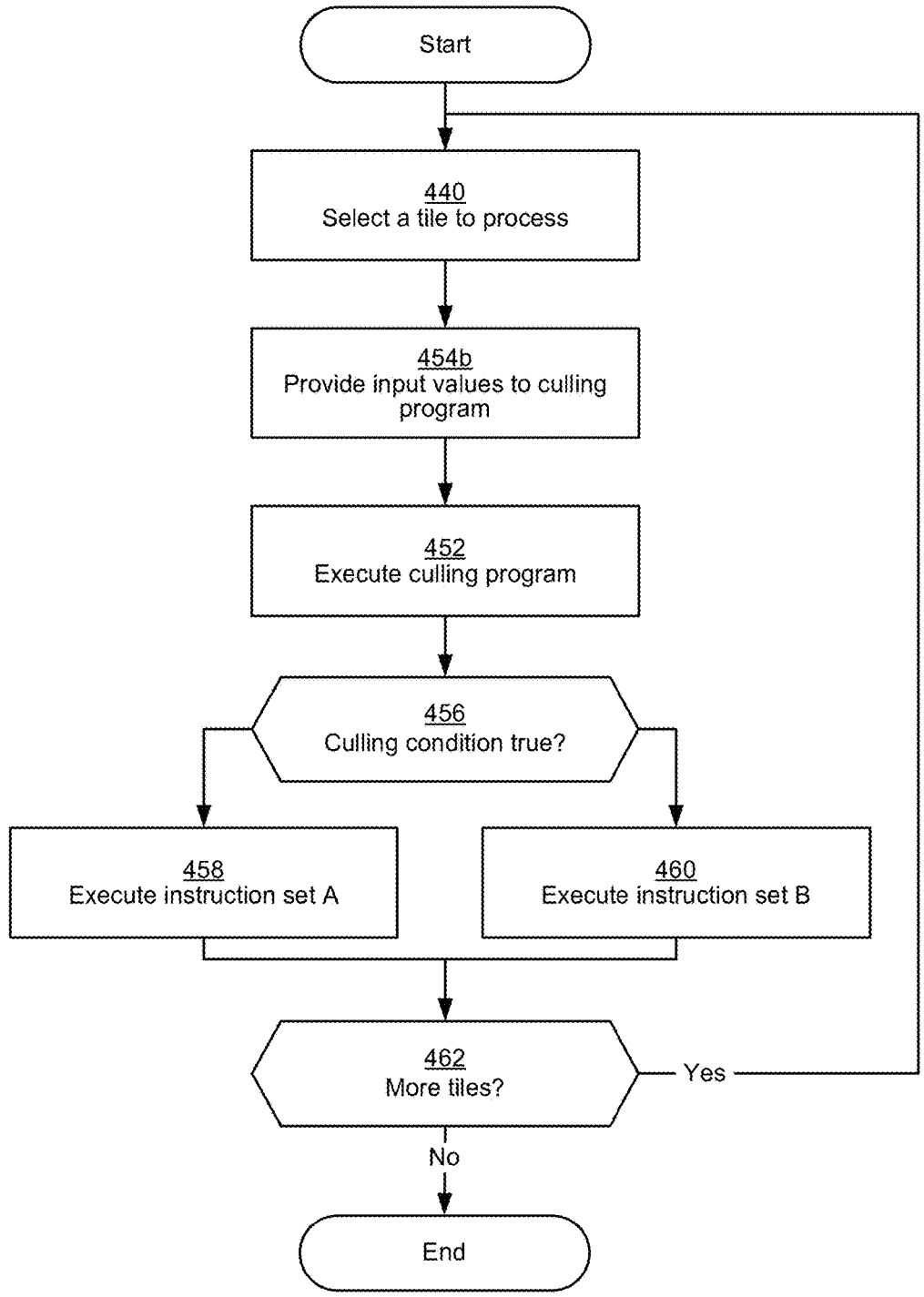

FIG. 4b shows a process essentially equal to the process described with reference to FIG. 4a. The select a tile to process step 440, the execute culling program step 452, the conditional culling condition true step 456, the execute instruction set A step 458, the execute instruction set B step 460 and the conditional more tiles step 462 are all equal to the corresponding steps of FIG. 4a.

However, the provide input values to culling program step 454b is here processed before the culling program is executed. In this step, all relevant input values are calculated, in this embodiment using interval arithmetic, and provided so that the culling program can access these values. This implements a 'push' mechanism for the input value calculation.

FIG. 5 shows an overview architecture of a typical general purpose computer 583 embodying the display adapter 100 of FIG. 1. The computer has a controller 570, such as a CPU, capable of executing software instructions. The controller 570 is connected to a volatile memory 571, such as a random access memory (RAM) and a display adapter 500, 100. The display adapter 500, 100 is in turn connected to a display 576, such as a CRT monitor, an LCD monitor, etc. The controller 570 is also connected to persistent storage 573, such as a hard drive or flash memory and optical storage 574, such as reader and/or writer of optical media such as CD, DVD, HD-DVD or Blu-ray. A network interface 581 is also connected to the controller 570 for providing access to a network 582, such as a local area network, a wide area network (e.g. the Internet), a wireless local area network or wireless metropolitan area network. Through a peripheral interface 577, e.g. interface of type universal serial bus, wireless universal serial bus, firewire, RS232 serial, Centronics parallel, PS/2, the CPU 570 can communicate with a mouse 578, a keyboard 579 or any other peripheral 580, including a joystick, a printer, a scanner, etc.

It is to be noted that although a general purpose computer is described above to embody the invention, the invention can equally well be embodied in any environment where digital graphics, and in particular 3D graphics, is utilized, e.g. game consoles, mobile phones, MP3 players, etc.

Now follows a disclosure how input values may be calculated using interval arithmetic, given an implementation of the instruction set as described above. A culling program can then be executed for a whole tile of fragments. However, in order to do so, bounding intervals for the varying (or interpolated) inputs also need to be computed.

Initially, the value of the varying attribute is computed in all four corners of the tile using interpolation. Then the bounding interval of these four values is computed, and it is called $\hat{a}_c \lfloor \underline{a}_c, \overline{a}_c \rfloor$. The bounding interval of the varying attribute at the triangle vertices are also computed, and called $\hat{a}_{tri} = \lfloor \underline{a}_{tri}, \overline{a}_{tri} \rfloor$. The final bounding interval of the varying attribute over the tile can be computed as $\hat{a}_{tile} = \lfloor \max(\underline{a}_{tri}, \underline{a}_c), \min(\overline{a}_{tri}, \overline{a}_c) \rfloor$. It is to be noted that there are other ways to compute the intervals, e.g. by considering all fragments overlapping a tile.

Figure 6A:
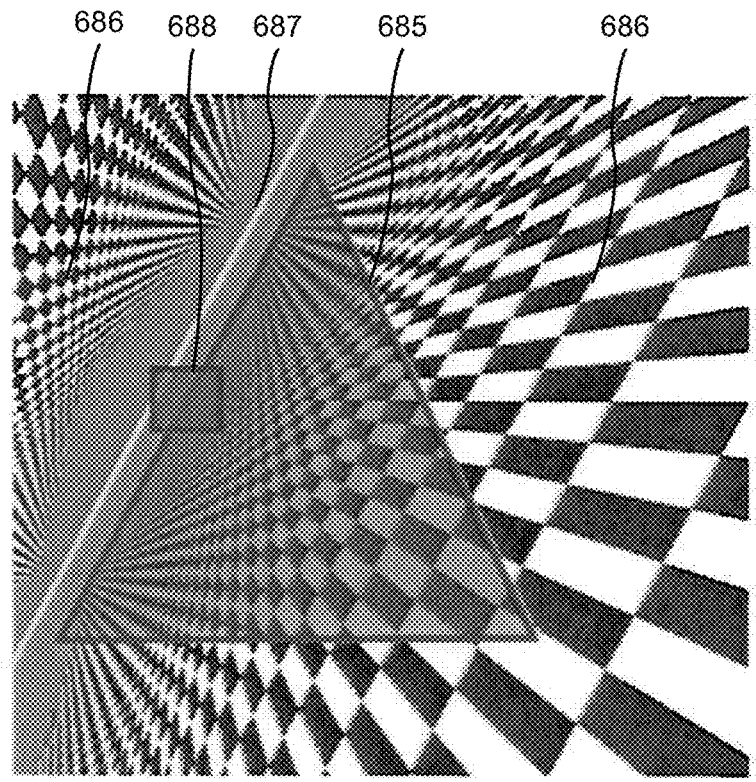
FIG. 6*a* is a display view illustrating an exceptional case of input values in the display adapter of FIG. 1.

Finally, an exceptional case must be dealt with, which is illustrated in FIG. 6a. Here, perspective correct interpolation over a triangle 685 is illustrated in form of a checkerboard texture 686. As can be seen, the texture is mirrored about a projection line 687, which is the line where the horizon of the triangle 685 would project if it was infinitely large. This mirroring effect is a form of back-projection caused by the division used in perspective correct interpolation. Now, assume that the bounding interval of some varying attribute is desired to be computed over a tile 688, which overlaps the projection line.

Figure 6B:
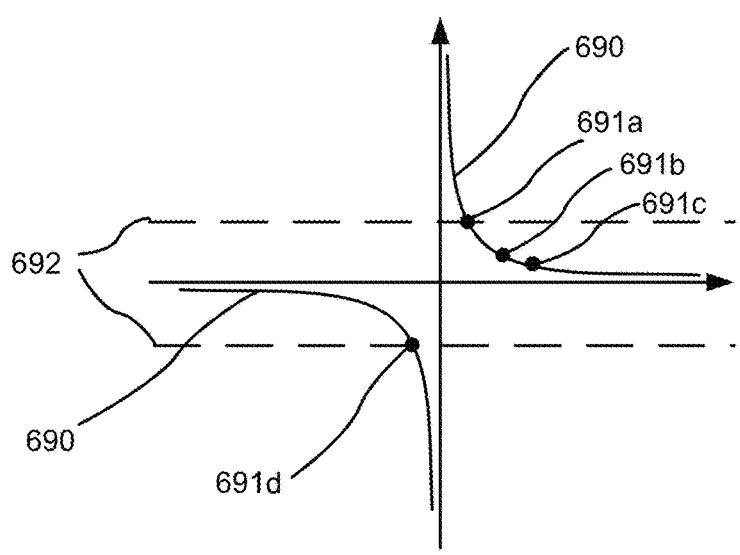
FIG. 6*b* is a graph illustrating input values in the case of FIG. 6*a*.

FIG. 6b shows the perspective correct interpolation function 690, as well as the values 691a-d acquired when the four corners of the tile 688 are interpolated. Note that the bounding interval 692 of these corners is clearly incorrect since this does not contain all of the values of the function 690 in this interval, as this function approaches infinity at the projection line.

This exceptional case is dealt with by setting a to $\hat{a}_{tile}$ to $\hat{a}_{tri}$ as the bounding interval for tiles overlapping the projection line. One might argue that this interval is overly conservative, but these problematic tiles are so rare that it is hard to motivate more complex computations. In this embodiment, only tiles actually overlapping the triangle are traversed, and perspectively correct barycentric coordinates are used to do the interpolation. Barycentric coordinates are disclosed in MCCOOL, M. D., WALES, C., AND MOULE, K. 2002, "Incremental and Hierarchical Hilbert Order Edge Equation Polygon Rasterization", in Graphics Hardware, 65-72.

The problematic tiles can easily be detected when computing perspectively correct barycentric coordinates for the corners of a tile. The perspectively correct barycentric coordinates are expressed as a rational function, and if the denominator is less than zero for any of the tile corners then the tile crosses the projection line.

Here now follows a disclosure of how N-dimensional texture lookups are performed. The interval instructions for performing N-dimensional texture lookups are an improvement over known approaches used for displacement map subdivision. The general idea is to provide a fast and efficient means of computing the bounding interval of the texture data over a given area. The remainder of this example will only consider two-dimensional textures, but generalization is straightforward.

Figures 7A, 7B:
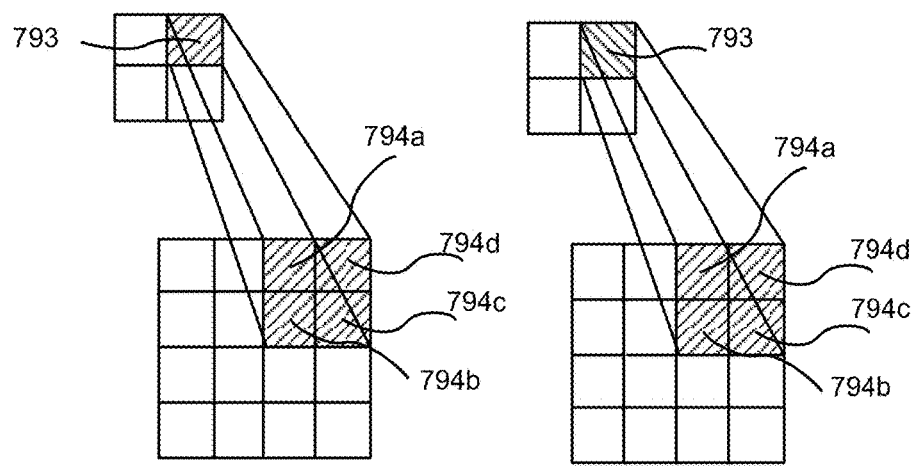
FIGS. 7*a* and 7*b* are illustratory perspective views of textures which can be used in the display adapter of FIG. 1.
Figures 8A, 8B, 8C, 8D:
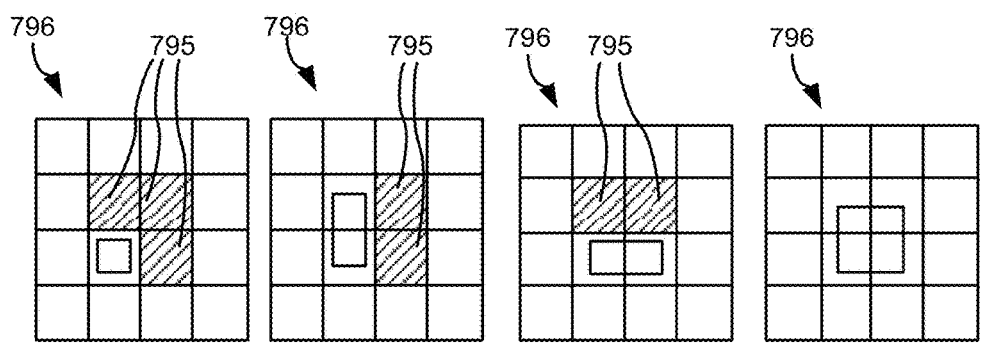
FIGS. 8*a-d* are illustratory views of textures which can be used in the display adapter of FIG. 1.

We initially compute two mipmap pyramids for each texture that is subject to interval-based texture lookup. As shown in FIGS. 7a and 7b, each element, e.g. element 793 in a mipmap is computed as the component-wise minimum, as shown in FIG. 7a, or maximum, as shown in FIG. 7b, value of the four corresponding texels, e.g. elements 794a-d, immediately under it in the pyramid. The final result can be seen as a mipmap pyramid of bounding intervals. This type of pre-computation can easily be handled by the driver, similarly to how standard mipmaps are auto-generated.

When performing a texture lookup, we wish to compute the bounding interval of the texture data over an axis-aligned bounding box, which is the texture coordinate interval. First, we compute an appropriate mipmap level as:

$$\lceil \log_2 (\max(\overline{t}_x - \underline{t}_x, \overline{t}_y - \underline{t}_y)) \rceil$$

where $\hat{t} = (\hat{t}_x, \hat{t}_y)$ is a two-dimensional interval of the unnormalized integer texture coordinates (i.e., they include the dimensions of the texture). These are appropriately rounded such that $\underline{t}_i$ is floored and $\overline{t}_i$ is ceiled for $i \in \{x, y\}$.

When transformed to this mipmap level, $\hat{t}$ will never be more than one texel wide in any dimension, and will be at least ½ texels wide in the widest dimension. Thus, we get four possible cases of texture coordinate intervals as illustrated in FIGS. 8a-d. We always sample a square of 2.times.2 texels from the texels 796 with the lower left corner at the texel of $(\underline{t}_x, \underline{t}_y)$, in the access scheme used for normal linear interpolation. The result of the texture lookup is then computed as the bounds of the colors of the texels that actually overlap the texture coordinate interval. That is, we discard the texels shaded indicated by reference 795 FIGS. 8a-c. Since the mipmap transformed {circumflex over (t)} will be rounded to the nearest integer coordinates, this overlap test can be implemented very efficiently by comparing just the final bit. Our texture lookup process is essentially as costly as a normal "trilinearly" filtered texture lookup. The biggest differences is that we need to be able to sample from the same level in two different mipmap pyramids rather than two adjacent levels, and that we compute the final result as a bounds rather than using linear interpolation. The reader should also note that this strategy natively supports all different kinds of wrapping modes, such as clamp, repeat and mirrored repeat. The appropriate wrapping mode can simply be applied to the interval coordinates, after mipmap level computation, to get the expected result. It can also be shown that this texture lookup process is conservative with respect to filtered texture lookups, as long as the filtered texture lookups compute derivatives using finite differences, and as long as the texture filter does not extend outside the area spanned by the derivatives.

If more texturing units are available, it is possible to improve the bounds of the interval texture lookup. The normal texture lookup assumes that we can read a block of 2.times.2 texels at a time. If we have enough hardware resources to read a block of 4.times.4 texels instead, then we can move one level down in the mipmap hierarchy and get a more accurate result.

Another important observation is that we only need to create the mipmap levels that are actually used in the culling program. This optimization is particularly important for algorithms taking place in screen space such as, for instance, order independent transparency. In this case we know beforehand that we only need the texture at its base level, and the mipmap level that corresponds to a tile on the screen. Note that such tile information is already available in modern hardware and can be read "for free". The minimum and maximum depth values can for instance be found in the hierarchical depth culling unit. It is also possible (but less likely) that the min and max colors are already computed for compression purposes, otherwise we need to compute them. Extensions for rendering to the base and tile mipmap level of a texture would greatly accelerate screen space algorithms.

We compute the min/max mipmap pyramid for the cube map, using the same approach as for two-dimensional textures. However, near edges and corners of the cube, special treatment is necessary. For the edges, we compute the mipmap color as the min or max of four texels on both sides of the edge, and for the corners we compute the mipmap color as the min or max of four texels on all three sides emanating from that corner. Texels on opposite sides of edges will therefore share the same colors in higher mipmap levels. Similarly, the three texels in a corner will also share a common color. It should be noted that the highest level mipmap will contain the min and max value over the full cube, as expected.

We can now use this mipmap pyramid to do conservative cube map lookups with accesses to only one side of the cube. First, we compute the interval based equivalent of the major axis. Given a texture coordinate interval $\hat{t}=(\hat{t}_x,\hat{t}_y,\hat{t}_z)$, we define the major axis, i, as the axis where $\underline{t}_i$ and $\overline{t}_i$ have the same sign, and where min ($|\underline{t}_i|$, $|\overline{t}_i|$) is maximized. If $\underline{t}_i$ and $\overline{t}_i$ have different signs over all axes, then we cannot find a major axis. However, this can only happen if the origin lies within the texture coordinate interval. In this case, the texture coordinate interval will project onto the entire cube map. We can easily handle this by choosing the highest mipmap level, and sample an arbitrary cube map face.

Once we have found a major axis, we conservatively project the texture coordinate interval on the corresponding side of the cube map. The projection is done by projecting the bounds of each of the two remaining axes separately. Let us consider an example where x is the major axis and y is the axis for which we want to project the bounds. There are then six possible cases of texture coordinate intervals (note that no interval may cross the y-axis since the x-axis would not be a major axis in that case), and the extreme points we have to project to compute the bounds. Fortunately, it is very easy to determine which these extreme points are. It is sufficient to look at the signs of the texture coordinate interval, and through a table lookup get the extreme points.

We project the extreme points for the remaining two axes to form a two-dimensional projected coordinate interval. This interval is used to compute a mipmap level and perform a two-dimensional texture lookup, identically to the method described in for the two-dimensional case above.

The invention has mainly been described above with reference to a few embodiments. However, as is readily appreciated by a person skilled in the art, other embodiments than the ones disclosed above are equally possible within the scope of the invention, as defined by the appended patent claims.

In view of the above, an objective of the invention is to solve or at least reduce the problems discussed above.

Generally, the above objectives are achieved by the attached independent patent claims.

According to a first aspect of the invention there has been provided a method for improving performance of generation of digitally represented graphics, comprising the steps of: selecting a tile comprising fragments to process; executing a culling program for the tile, the culling program being replaceable; and executing a set of instructions, selected from a plurality of sets of instructions based on an output value of the culling program, for each of a plurality of subsets of the fragments. It is therefore possible to create culling programs processing the tile, and let these be executed to improve the performance.

In the step of executing a culling program for said tile, arithmetic representing a whole tile may be used for at least part of instructions of the culling program. This allows processing of a plurality of fragments at a time which improves the performance.

In the step of executing a culling program, interval arithmetic may be used for at least part of instructions of the culling program. Interval arithmetic allows representation of a plurality of fragments and can be implemented relatively easily.

In the step of executing a culling program, affine arithmetic may be used for at least part of instructions of the culling program. Affine arithmetic allow a relatively accurate representation of a plurality of fragments.

The method may further comprise the step of: providing values representing at least one attribute of a plurality of fragments of the fragments to the culling program.

Each of the subsets of fragments of the tile may comprise one fragment. In other words, processing is performed for each fragment.

The step of executing a set of instructions may involve, when the output value satisfies a culling condition, executing a first set of instructions for each of a plurality of subsets of the fragments, and when the output value fails the culling condition, executing a second set of instructions for each of the plurality of subsets of fragments.

The first set of instructions may comprise fewer instructions than the second set of instructions.

The first set of instructions may comprise zero instructions. In other words, if the culling condition is true, no instructions are processed, resulting in improved performance.

In the step of executing a set of instructions, the culling condition may correspond to the fragments of the tile making no contribution to a finally rendered image. This is a source of performance improvement in the invention.

In the step of executing a set of instructions, the culling condition may correspond to the fragments of the tile making a contribution less than a threshold value to a finally rendered image. This will improve performance even further, with a tradeoff of reduced image quality. The threshold can be configured arbitrarily according to a desired balance of performance and image quality.

In the step of providing values, the values may be calculated using interval arithmetic, using a plurality of fragments of the tile as input.

In the step of providing values, the values may be calculated using affine arithmetic, using a plurality of fragments of the tile as input.

In the step of providing values, the values may be calculated as a result of the culling program requesting access to the values. In other words, a pull mechanism is used to provide values to the culling program.

In the step of providing values, the values may be calculated prior to executing the culling program. In other words, a push mechanism is used to provide values to the culling program.

The step of selecting a tile comprising fragments to process may involve selecting a tile which is at least partly overlapped by a polygon being processed. In other words, a tile with potential contribution from the polygon is selected.

The fragments may be fragments associated with the polygon. Consequently, only fragments of the polygon in the tile are processed.

The steps of selecting a tile, executing a culling program, and executing a set of instructions are repeated until all tiles which are at least partly overlapped by the specified polygon have been processed. When a polygon has been processed, the next polygon may be processed similarly, and so forth until all polygons of an image have been processed.

In the step of executing a set of instructions, at least one of values calculated by said culling program may be used in said selected set of instructions or in processing by subsequently used processing units. These valued may for example be used in a hierarchical depth culling performed at a later stage.

A second aspect of the invention is a display adapter adapted to generate digitally represented graphics comprising: means for selecting a tile comprising fragments to process; means for executing a culling program for the tile, the culling program being replaceable; and means for executing a set of instructions, selected from a plurality of sets of instructions based on an output value of the culling program, for each of a plurality of subsets of the fragments. It is to be noted that the second aspect of the invention can be embodied with any combination of features corresponding to any the features of the first aspect of the invention.

A third aspect of the invention is a computer program product comprising software instructions that, when executed in a controller, performs the method according to the first aspect of the invention.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   selecting a set of a plurality of fragments;
   automatically deriving by a hardware processor, a culling program including a second set of a plurality of instructions selected from a pixel shader program including a first set of culling instructions, said first and second sets being different and said second set including less instructions than said first set and said second set derived by modifying instructions in said first set of instructions to use interval arithmetic;
   rasterizing a primitive by executing the culling program for the set of fragments to generate an output; and
   based on the output of culling program, selecting a first shader program to execute on said fragments, said first shader program selected from a set of shader programs including said pixel shader program.

2. The method according to claim 1, including representing a whole tile of fragments for at least part of instructions of said culling program.

3. The method according to claim 1, including using affine arithmetic for at least part of instructions of said culling program.

4. The method according to claim 1, including providing values representing at least one attribute of a plurality of said fragments to said culling program.

5. The method according to claim 1, wherein selecting and executing said first shader program in response to said output involves, when said output satisfies a culling condition, selecting and executing a second shader program from said set of shader programs for each of said selected set of fragments, and when said output does not satisfy the culling condition, selecting and executing said pixel shader program from said set of shader programs for each of said selected set of fragments.

6. The method according to claim 5, wherein in selecting and executing said first shader program, said culling condition corresponds to said fragments making no contribution to a finally rendered image.

7. The method according to claim 5, wherein in selecting and executing said first shader program, said culling condition corresponds to said fragments making a contribution less than a threshold value to a finally rendered image.

8. The method according to claim 4, wherein providing values includes using interval arithmetic and using a plurality of fragments as input.

9. The method according to claim 4, wherein providing values includes using affine arithmetic and using a plurality of fragments as input.

10. The method according to claim 4, wherein providing values includes calculating values as a result of said culling program requesting access to said values.

11. The method according to claim 4, wherein in said step of providing values, said values are calculated prior to executing said culling program.

12. The method according to claim 1, wherein selecting a set of fragments includes selecting a tile which is at least partly overlapped by a polygon being processed.

13. The method according to claim 12, wherein said fragments are fragments associated with said polygon.

14. The method according to claim 12, including selecting the tile, executing said culling program, providing values, and executing a set of instructions repeatedly until all tiles which are at least partly overlapped by said specified polygon have been processed.

15. The method according to claim 14, wherein at least one of values calculated by said culling program is used with first shader program by subsequently used processing units.

16. A processor-based device comprising a display adapter to:
   select a set of a plurality of fragments;
   automatically derive by a processor, a culling program including a second set of a plurality of instructions selected from a pixel shader program including a first set of culling instructions, said first and second sets being different and said second set including less instructions than said first set and said second set derived by modifying instructions in said first set of instructions to use interval arithmetic;

rasterize a primitive by executing the culling program for the set of fragments to generate an output, and based on the output of culling program, select a first shader program to execute on said fragments, said first shader program selected from a set of shader programs including said pixel shader program; and a storage storing said instructions.

17. The device of claim 16 further including a display adapter to represent a whole tile of fragments for at least part of the instructions of said culling program.

18. The device of claim 16, said display adapter to use affine arithmetic for at least part of the instructions of said culling program.

19. A non-transitory computer readable medium storing instructions for execution by a computer to:

select a set of a plurality of tile comprising fragments;

select from a culling program, including a second set of a plurality of instructions selecting from a pixel shader program including a second set of culling instructions, said first and second sets being different and said second set including less instructions than said first set and said second set derived by modifying instructions in said first set of instructions to use interval arithmetic;

rasterize a primitive by executing the culling program for the set of fragments to generate an output; and based on the output of culling program, select a first shader program to execute on said fragments, said first shader program selected from a set of shader programs including said pixel shader program.

20. The medium according to claim 19, including representing a whole tile of fragments for at least part of instructions of said culling program.

21. The medium according to claim 20, including using affine arithmetic for at least part of instructions of said culling program.

22. The medium according to claim 20, including providing values representing at least one attribute of a plurality of said fragments to said culling program.

\* \* \* \* \*